(12) United States Patent
Graves

(10) Patent No.: US 12,124,063 B2
(45) Date of Patent: Oct. 22, 2024

(54) FRONT PANEL FOR A VIDEO DISPLAY

(71) Applicant: Prysm Systems, Inc., Milpitas, CA (US)

(72) Inventor: Robert Graves, Methuen, MA (US)

(73) Assignee: Prysm Systems, Inc., San Jose, CA (US)

( * ) Notice: Subject to any disclaimer, the term of this patent is extended or adjusted under 35 U.S.C. 154(b) by 271 days.

(21) Appl. No.: 17/394,693

(22) Filed: Aug. 5, 2021

(65) Prior Publication Data

US 2023/0043270 A1  Feb. 9, 2023

(51) Int. Cl.
*G02B 5/20* (2006.01)
*G02B 1/14* (2015.01)
*G02B 5/22* (2006.01)

(52) U.S. Cl.
CPC ............... *G02B 5/208* (2013.01); *G02B 1/14* (2015.01); *G02B 5/223* (2013.01)

(58) Field of Classification Search
None
See application file for complete search history.

(56) References Cited

U.S. PATENT DOCUMENTS

| | | | |
|---|---|---|---|
| 10,063,817 B1 | 8/2018 | Fairchild et al. | |
| 10,365,407 B2 | 7/2019 | Bukesov et al. | |
| 10,674,123 B2 | 6/2020 | Fairchild et al. | |
| 2015/0241765 A1* | 8/2015 | Hajjar | G03B 21/567 353/7 |
| 2018/0009997 A1* | 1/2018 | Bhagwagar | C09D 183/06 |
| 2021/0253788 A1* | 8/2021 | Namiki | B32B 5/18 |

FOREIGN PATENT DOCUMENTS

| | | | | |
|---|---|---|---|---|
| CN | 101088114 A | * | 12/2007 | ............. B32B 27/36 |
| CN | 110234718 A | * | 9/2019 | ............ C09D 183/04 |
| JP | 2001019864 A | * | 1/2001 | |
| JP | 5691956 B2 | * | 4/2015 | |
| WO | WO-9942758 A1 | * | 8/1999 | ............... B60Q 1/34 |

* cited by examiner

*Primary Examiner* — Phu Vu
(74) *Attorney, Agent, or Firm* — PATTERSON + SHERIDAN, LLP; Steven H. VerSteeg

(57) ABSTRACT

Certain aspects of the present disclosure provide techniques for a front panel for a video display system. According to disclosed embodiments, a substrate is fabricated to incorporate materials having desired functional properties, such as the blocking of ultraviolet visible (UVV) laser light, and near infrared light, into the substrate material. After extrusion of the substrate with desired functional properties, an anti-glare hardcoat may be spray-coated to the front and back of the front panel to provide anti-glare as well as anti-stiction properties.

19 Claims, 5 Drawing Sheets

FRONT PANEL FOR A VIDEO DISPLAY

BACKGROUND OF THE DISCLOSURE

Field of the Disclosure

Aspects of the present disclosure relate to video displays, and more particularly to a laser wavelength blocking front panel for a video display.

Description of the Related Art

Large scale high definition large format video displays (e.g., 85" to 225" and larger) have become common place in customer experience centers, team collaboration rooms, corporate board rooms, high end consumer entertainment, as well as other business and consumer venues. Improved semiconductor manufacturing processes, image process, and modularization of technologies that enable large video displays to be brought into more homes and businesses at an ever-increasing pace.

Front panels for such a video display require a number of functional properties to provide a good user experience. Among these are laser-blocking properties to mitigate the effect of laser light used to generate images, low stiction, neutral density layers, to name a few. Conventionally, for each of these properties, a functional layer provided, adhered to a substrate (or another functional layer) via an adhesive layer, requiring relatively thick, multi-layer structures. In addition to each functional and adhesive layer adding weight and thickness to the front panel, concomitantly, the substrate carrying these layers becomes increasingly thick.

What is needed are apparatus, methods, and systems for front panels to obtain functional properties without separate layers of material for each.

SUMMARY OF THE DISCLOSURE

The present disclosure generally relates to a front panel for a video display system. According to disclosed embodiments, a substrate is fabricated to incorporate materials having desired functional properties, such as the blocking of laser light, and near infrared light, into the substrate material. After extrusion of the substrate with desired functional properties, an anti-glare (AG) hardcoat may be spray-coated to the front and back of the front panel to provide anti-glare, increased scratch resistance, durability, as well as having anti-stiction properties.

Certain embodiments provide a front panel for a multi-panel display, that includes a substrate having a front side and a backside, the substrate comprising an embedded dye or dyes for blocking one or more wavelengths of one of ultraviolet visible (UVV) or near infrared (NIR) light, a front-side hardcoat mechanically coupled to the front side of the substrate, and a back side hardcoat mechanically coupled to the backside of the substrate. The front panel includes a plurality of mounting points arranged at a perimeter region of the substrate, for mounting the front panel in a frame.

Further embodiments provide a display system that includes a plurality of light engines, a plurality of back panels, each of the plurality of back panels optically coupled to a respective one of the plurality of light engines, and a front panel optically coupled to the plurality of back panels. The front panel includes a substrate comprising a first polycarbonate component containing a light blocking dye configured to block one of ultraviolet visible (UVV) or near infrared (NIR) light, a backside hardcoat deposited on a backside of the substrate, the backside optically coupled to the plurality of back panels, and a front-side hardcoat deposited on a front side of the substrate. The front panel of the display system further includes a plurality of mounting points about a perimeter of the substrate, capable of mounting the substrate to a frame.

Further embodiments provide a method for fabricating a front panel for a display system, that includes combining a first pellet group comprising polycarbonate pellets with a second pellet group comprising polycarbonate pellets containing light-blocking dye configured to block one of ultraviolet visible (UVV) or near infrared (NIR) light, to form an aggregate pellet group, melting the aggregate pellet group to an aggregate mixture, and extruding a substrate having a front side and a backside using the aggregate mixture. The method includes applying a hardcoat to the front side and backside, and machining a plurality of front panel openings along an edge of the substrate.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
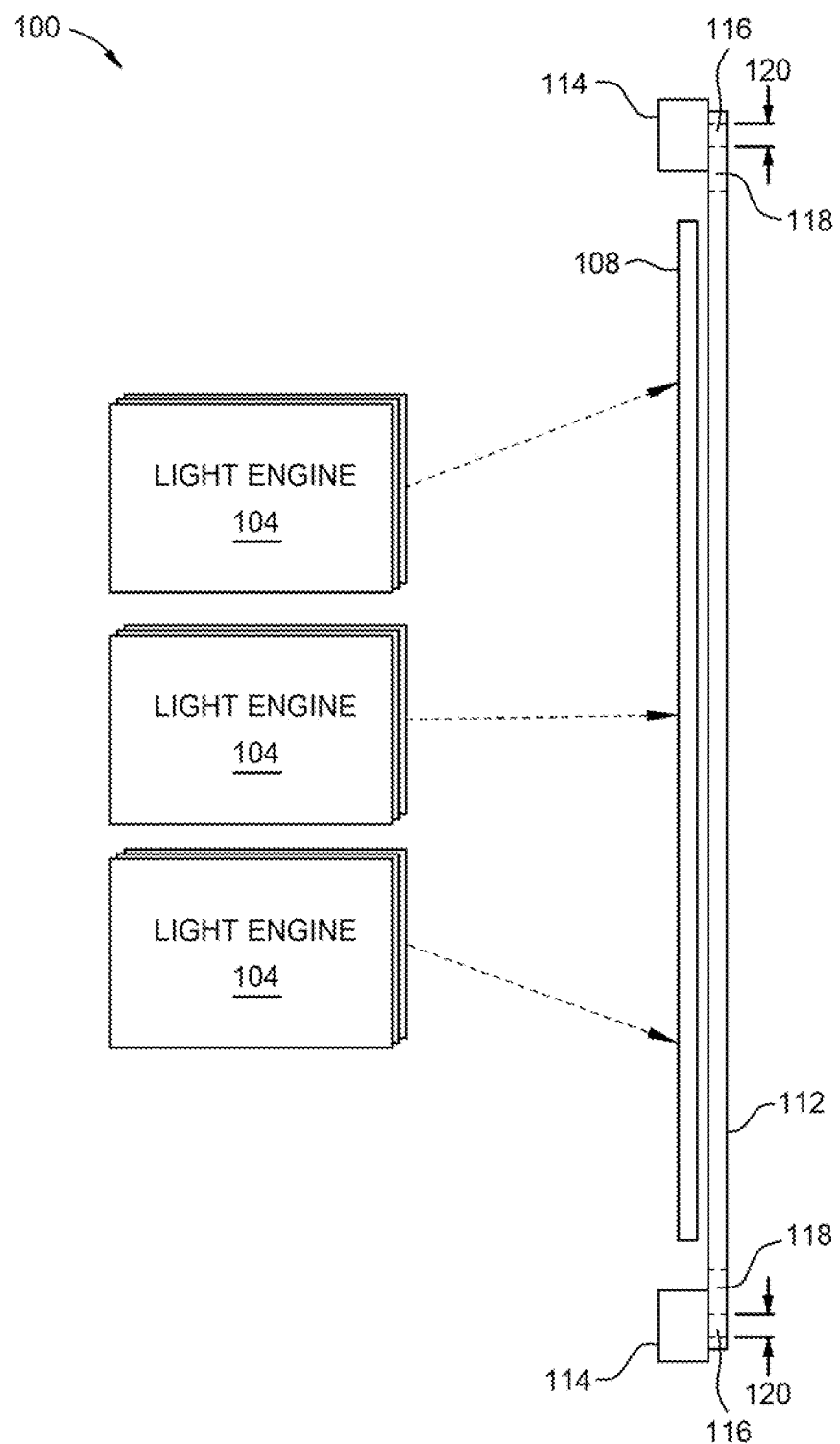
FIG. 1 depicts a video display system, according to certain embodiments.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Certain aspects of the present disclosure provide techniques for a front panel for a video display system. According to disclosed embodiments, a substrate is fabricated to incorporate materials having desired functional properties, such as the blocking of ultraviolet visible (UVV) laser light such as UVV light having a wavelength of about 395-455 nm, and near infrared light, such as near infra-red light having a wavelength of about 800-2500 nm, into the substrate material. After extrusion of the substrate with desired functional properties, an anti-glare hardcoat may be spray-coated to the front and back of the front panel to provide anti-glare, increased durability, scratch resistance, as well as anti-stiction properties.

Conventionally, front panels for light phosphor display (LPD) based video displays involved building up one or more laser blocking substrates about 50 µm each, that include anti-glare/anti-abrasion layers, and adhering these to a polycarbonate substrate via a 25-50 µm optically transparent adhesive layer that may be about 25-50 µm thick and according to certain embodiments 40 µm thick, to a polycarbonate supporting layer of at least 3 mm thick for a 190" display. This thickness of the polycarbonate layer is needed in conventional approaches to provide the front panel with sufficient strength and stiffness to carry the laser blocking substrates and concomitant adhesive layers. This process is time consuming and expensive as multiple substrates are fabricated, resulting in a relatively thick (4.518 mm) front panel, that could not be bent or rolled up for easy transport to an installation site for a large (e.g., 190" or larger) display.

According to disclosed embodiments, a polycarbonate substrate is fabricated to incorporate light blocking materials, such as a dye or dyes for blocking laser light such as UVV laser light having a wavelength of 395-455 nm laser light and in certain embodiments 405 nm to transmission of wavelengths of laser light that may be harmful to humans, near infrared (NIR) light such as NIR light having a wavelength of about 800-2500 nm, and blocking of other wavelengths of light, so that the polycarbonate (PC) substrate contains these properties after extrusion. Once extruded, an anti-glare (AG) hardcoat may be applied to the PC substrate via spray, a relatively simple processing step. Because there are no additional substrates or layers to otherwise be applied to the PC substrate, it can have a reduced thickness, in some embodiments may be 3 mm thick for a 190" display, and may be from 2-10 mm thick, according to certain embodiments, depending on the size of the display to which the front panel will be applied. Moreover, due to the simplified structure (i.e., a PC substrate and AG hardcoat on the front and back surfaces), the front panel may be rolled up and easily transported, for example, in a standard elevator.

FIG. 1 depicts a video display system 100, according to certain embodiments. Video display system includes one or more light engines, such as light engine 104. A light engine 104 is a device that receives video data and to create controlled raster scanned light pulses, to impinge light energy on one or more light phosphor display (LPD) panels 108, that in turn provides images based on laser light provided by the light engine 104. The one or more LPD panels 108 according to certain embodiments in a tiled formation are positioned adjacent to a front panel 112, through which images generated by the LPD panels 108 may be viewed. In this context, front panel 112 may include functionality to block certain wavelengths of light that are generated by the LPD panels 108 as discussed herein, in addition to providing durability and aesthetic qualities to the video display system 100. Video display system 100, according to certain embodiments, may include a frame 114 that includes a number of peg members 116 for coupling to the front panel 112. To accommodate mounting the front panel 112 to the peg members 116, front panel 112 may have a perimeter region 118 that includes front panel openings 120, also referred to as openings that correspond to the peg members 116. The coupling between the front panel 112 and the frame 114 according to certain embodiments the one or more of the peg members 116 comprises a triangular peg of on the frame 114 positioned within a correspondingly-shaped and sized triangular-shaped front panel opening 120 in the front panel 112. In these embodiments, the triangular shape of the peg member 116 and front panel opening 120 provides a flat surface interface by which the tensile force of the front panel 112 can be transferred to the frame 114 at a relatively uniform level of pressure, or stated otherwise, as pressure dispersant openings that disperse pressure of mounting the front panel 112 to the peg members 116 among the front panel openings 120. Other pressure dispersant shapes for the front panel openings 120 may be employed according to certain embodiments, such as circular, rectangular, ovular, elliptical, polygonal, and the like, and a combination of front panel opening 120 shapes can be used as well. Embodiments that employ a triangular shape of the peg member 116 and front panel opening 120 may have relatively large corner radii to distribute stress on the front panel 112. The front panel openings 120 are spaced close enough to each other to maximize the number of contacts (and thus decrease the stress per opening), while being spaced apart from each other to minimize hole-to-hole stress spreading. According to certain embodiments, front panel openings 120 may be coupled to one or more peg members 116 via tensioners.

Figure 2:
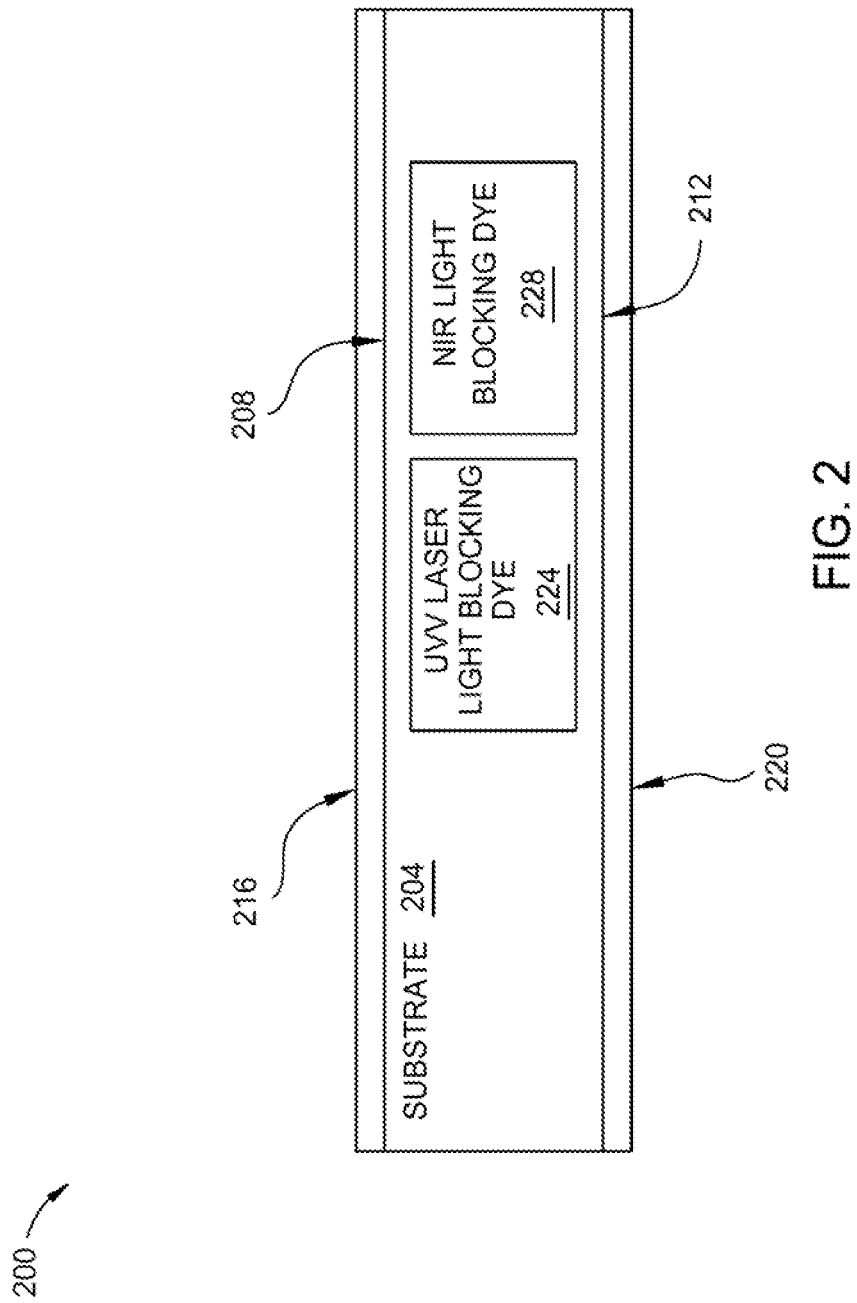
FIG. 2 depicts a cross-sectional view of a front panel for a video display system, according to certain embodiments.

FIG. 2 depicts a cross-sectional view 200 of a front panel 112 for a video display system 100, according to certain embodiments. Front panel 112 is comprised of a substrate 204 having a front-side 208 and a backside 212, a front-side hardcoat 216, and a backside hardcoat 220, according to certain embodiments.

Substrate 204 may be a polycarbonate (PC) material such as a high optical grade PC according to certain embodiments, and other materials that may make up the substrate may include acrylic and/or polyethylene terephthalate glycol (PETG). PC pellets may be measured out and melted, with the melted PC extruded to form the substrate. One or more dyes may be added to the PC pellets and melted therewith, to provide desired properties in the substrate. In some embodiments, the dyes are provided in pellet form, having been previously mixed with other substances, such as PC, or the dyes may be provided as such to the PC pellet mix. The substrate 204 may be fabricated to be from 2-10 mm thick depending on desired physical and functional properties, and in some embodiments is 3 mm thick.

According to certain embodiments, dyes blocking particular wavelengths of light are added to the PC pellets prior to melting. In one embodiment, light blocking dyes in this context include materials being chemically stable and soluble in PC, acrylic, and/or PETG. In order to provide a functional property of blocking UVV laser light, to achieve an optical density of about 1.15+/−0.05 for wavelengths such as 395-455 nm laser light, and 405 nm laser light in certain embodiments, one or more laser light blocking dyes such as UVV laser light blocking dye 224 are added to the PC pellets so that the dye may be embedded in the resulting substrate 204. According to certain embodiments, UVV laser light blocking dye 224 is added to achieve a concentration of about 6-8 grams of UVV laser light blocking dye 224 per kilogram of PC forming the substrate 204. For example, in embodiments where the thickness of the substrate 204 is 3 mm, and where a diagonal dimension of the front panel 112 is 190", the weight of the substrate 204 is about 3.6 kg/m$^2$, 21.6-28.8 grams of UVV laser light blocking dye 224/m$^2$ are utilized in fabrication of the substrate 204.

In some embodiments, either additionally or alternatively, one or more infrared (IR) light blocking dyes such as NIR light blocking dye 228 that may be a near IR wavelength blocking dye, may be added, so that the NIR light blocking dye 228 may be embedded in the substrate 204. According to certain embodiments, additional dyes may be added.

Front-side hardcoat 216 may be provided to the side of the substrate 204 that will be facing a viewer. According to certain embodiments, front-side hardcoat 216 is sprayed on to the substrate 204 after extrusion, to form a thickness of 1-10 microns. Front side hard coat 216 may have anti-glare, anti-static, and/or oleophobic properties, or other functional properties desired by the designer.

Backside hardcoat 220 may be provided to the side of the substrate 204 that will be facing the LPD panels 108. According to certain embodiments, backside hardcoat 220 is sprayed on to the substrate 204 after extrusion, to form a thickness of 1-10 microns. Backside hard coat 220 may have anti-glare, anti-static, and/or anti-stiction properties, or other functional properties desired by the designer.

According to certain embodiments, one of front-side hardcoat 216 and backside hardcoat 220 may be applied as a film adhered to substrate 204.

In this context, the front-side and backside hard coat includes one or more ultraviolet (UV) curable acrylics and/or UV curable modified acrylics. It is to be understood that other types of hardcoat materials may be used, such as UV curable epoxies and solvent based hard coatings, or combinations thereof.

Figure 3:
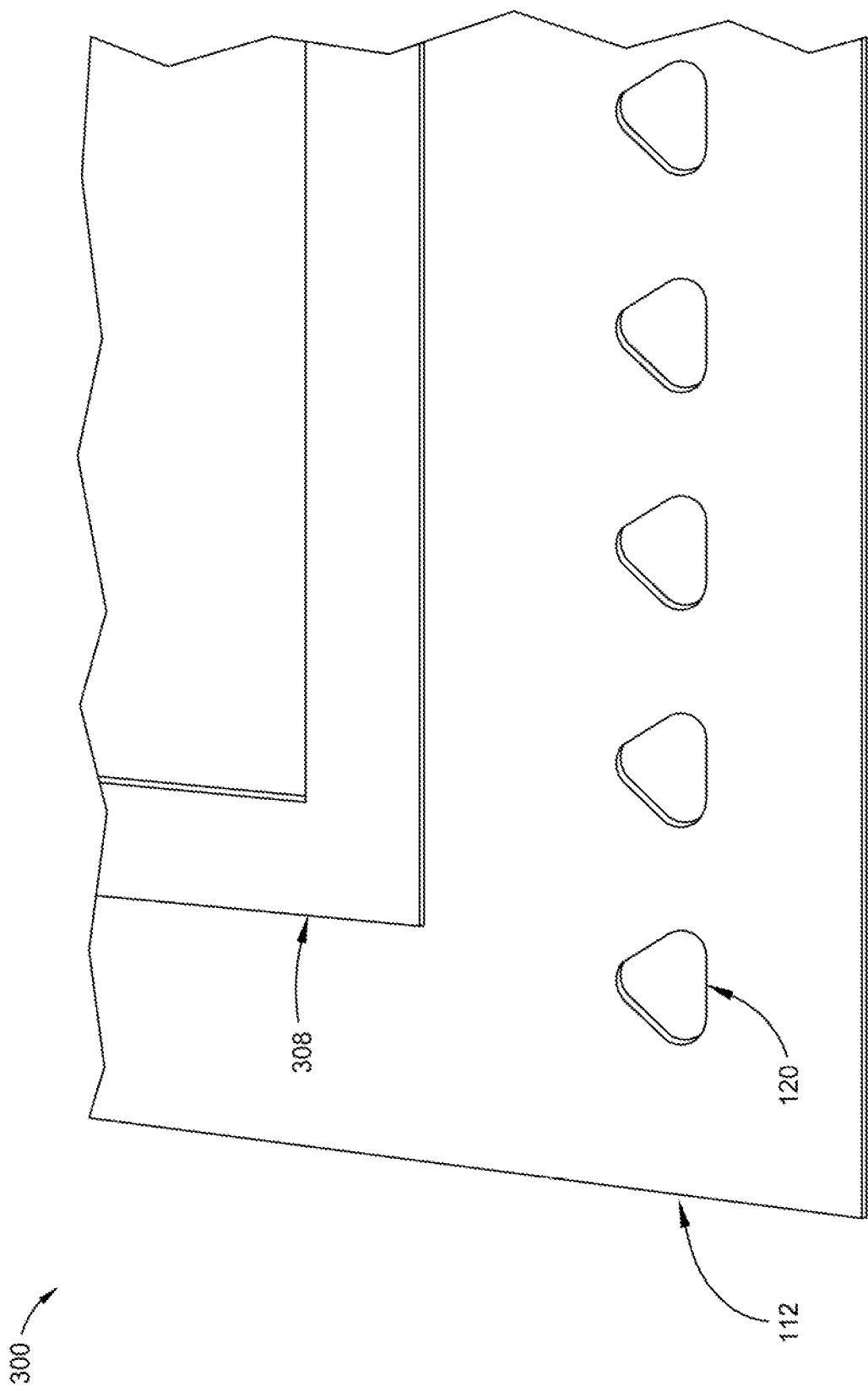
FIG. 3 depicts a schematic view of front panel openings in the front panel, according to certain embodiments.

FIG. 3 depicts a schematic view 300 of front panel openings 120 in the front panel 112, according to certain embodiments. Front panel 112 further includes front panel openings 120, for coupling the front panel 112 in the frame 114 via one or more peg members 116. In certain embodiments, the front panel openings 120 may be provided along an edge, or perimeter region 118, of the front panel 112. The front panel openings 120 may be provided in the front panel 112 by machining, such as by a mill, a punch, chemical etching, or a cutter such as a laser or plasma cutter. According to certain embodiments, the front panel openings 120 are provided after the application of either or both of the front-side hardcoat 216 and backside hardcoat 220 to the substrate 204 of the front panel 112. In some embodiments, prior to application of one or both of the hardcoat layers, the substrate 204 is masked with a mask 308 so as to prevent application of a hardcoat layer to the perimeter region 118 where the front panel openings 120 will be provided. In other embodiments, the front panel openings 120 may be provided in the front panel 112, the perimeter region 118 masked, and then application of the hardcoat layers to the front panel 112. In some embodiments, the hardcoat layers may be applied to the substrate 204, and front panel openings 120 provided by machining the hardcoat layers in addition to the substrate 204 of the front panel 112.

Figure 4:
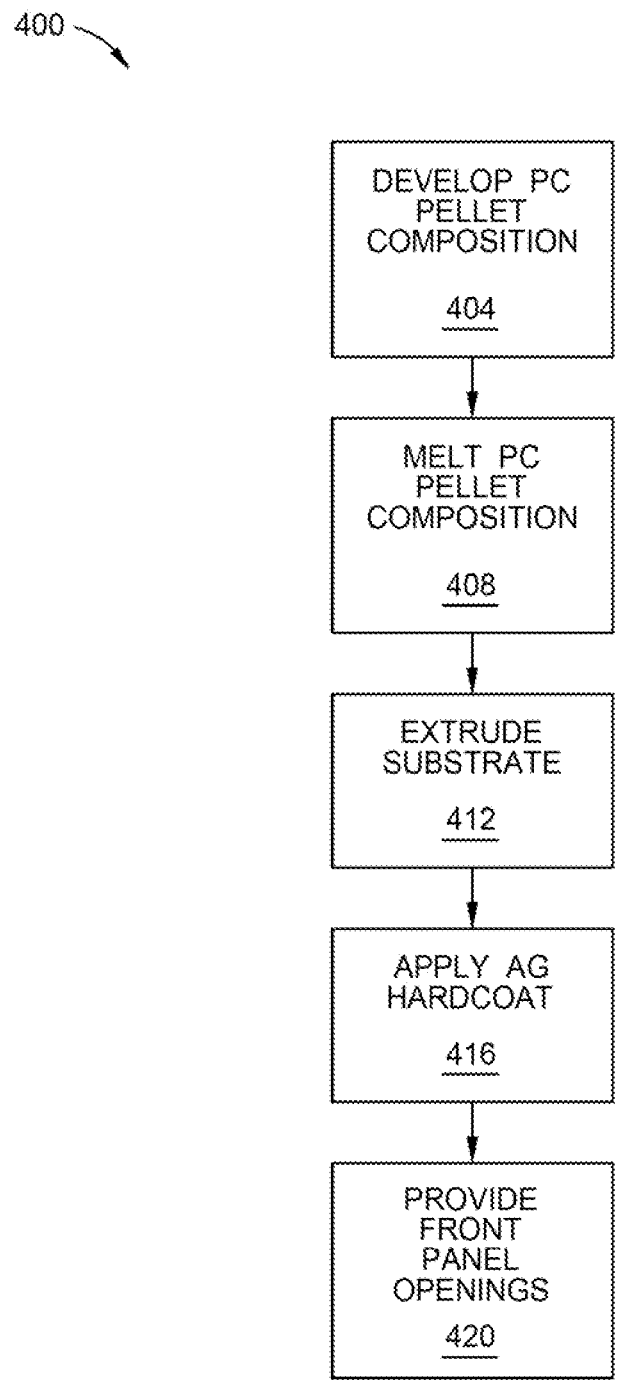
FIG. 4 depicts a flow diagram for producing a front panel for a video display system, according to certain embodiments.

FIG. 4 depicts a flow diagram 400 for producing a front panel 112 for a video display system 100, according to certain embodiments. At block 404 a PC pellet composition is developed. Based on design requirements, PC pellets, as well as dyes providing additional functional properties to the resulting substrate 204, are chosen, to create a PC pellet composition to produce the substrate 204 with desired properties. In some embodiments, the dyes are embodied in dye-containing PC pellets, and in some embodiments the dyes may be added directly to the PC pellet composition.

At block 408, the PC pellet composition is melted to form a viscous mass, and at block 412 the viscous mass is extruded at the desired thickness for the substrate 204. Once the substrate 204 is extruded, at block 416 a hardcoat, such as an AG hardcoat, may be applied to one or both major surfaces of the substrate 204. In some embodiments, once the substrate 204 is extruded, a mask may be applied along a perimeter of the substrate 204 to facilitate provision of one or more front panel openings 120.

At block 420, one or more front panel openings 120 are provided in the substrate 204, such as about a perimeter of the substrate.

Figure 5:
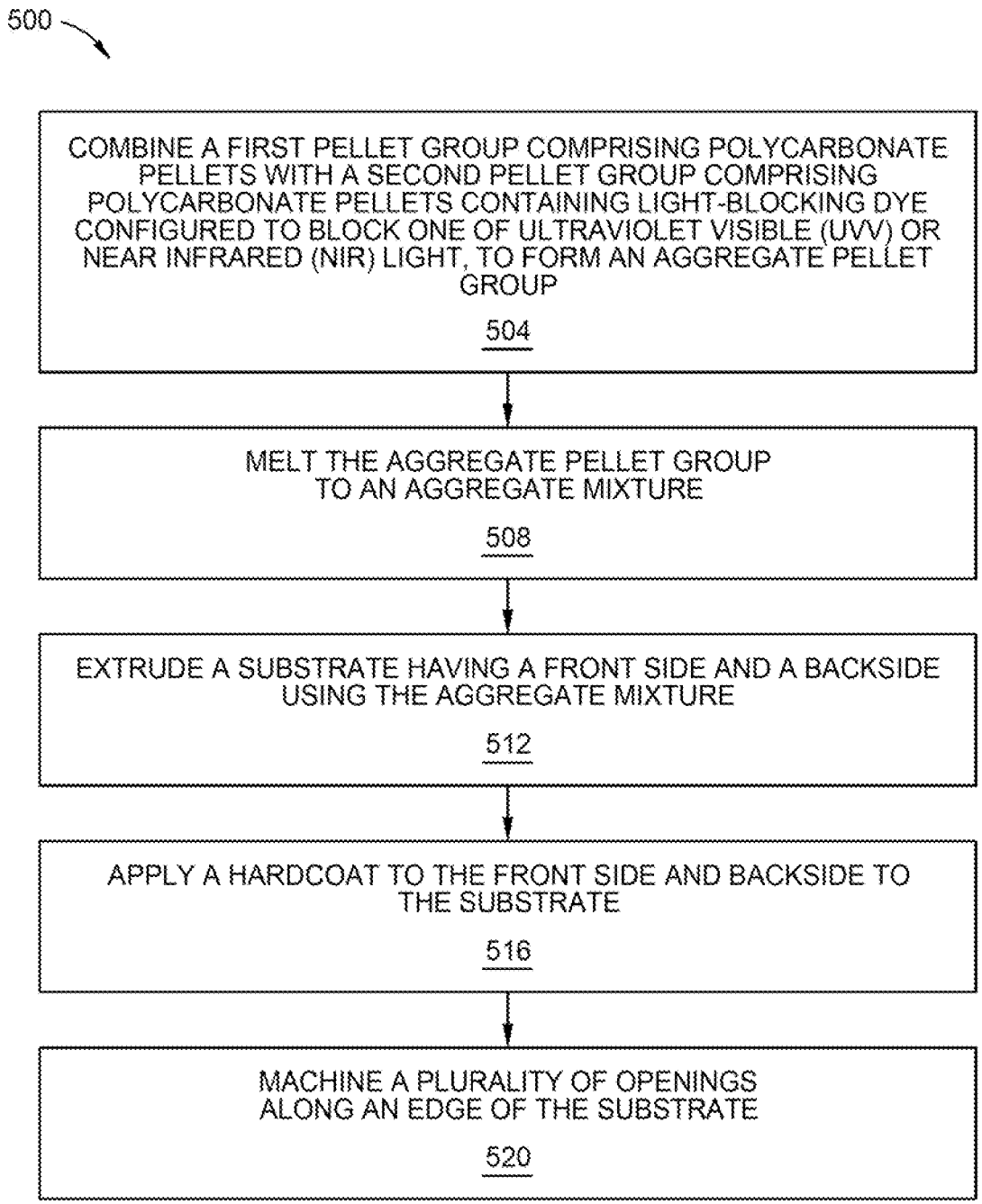
FIG. 5 depicts a method for fabricating a front panel for a video display, according to certain embodiments.

FIG. 5 depicts a method 500 for fabricating a front panel 112 for a video display system 100, according to certain embodiments. At block 504 a first pellet group comprising polycarbonate pellets with a second pellet group comprising polycarbonate pellets containing light-blocking dye, combination of dyes, or combinations of pellets containing different light blocking dyes configured to block one of ultraviolet visible (UVV) or near infrared (NIR) light, is combined to form an aggregate pellet group. According to certain embodiments, the light blocking dye or combinations dyes comprises a near infrared (NIR) blocking dye and/or a UVV laser light blocking dye having a wavelength of 395-455 nm laser light and in certain embodiments 405 nm laser light.

At block 508, the aggregate pellet group is melted to form an aggregate mixture.

At block 512, the substrate 204 is extruded having a front side and a back side, using the aggregate mixture. According to certain embodiments, the substrate 204 has a concentration of about 7 grams of light blocking dye per square meter of the substrate 204. According to certain embodiments, the substrate may have a thickness ranging from 2-10 mm.

At block 516, a hardcoat, such as one of front-side hardcoat 216 and backside hardcoat 220 is applied to the substrate 204.

At block 520 a plurality of front panel openings are machined along an edge of the substrate 204.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A front panel for a multi-panel display, comprising:
 a substrate having a front side and a backside, the substrate comprising an embedded dye for blocking one or more wavelengths of one of ultraviolet visible (UVV) or near infrared (NIR) light, wherein the embedded dye blocks wavelengths consisting of 395 nm-455 nm and 800 nm-2500 nm, wherein the substrate is polycarbonate, wherein the substrate has an optical density of 1.15+/−0.05;
 a front-side hardcoat mechanically coupled to the front side of the substrate, wherein the front-side hardcoat comprises UV curable acrylic and/or UC curable modified acrylics;
 a back side hardcoat mechanically coupled to the backside of the substrate, wherein the back side hardcoat comprises UV curable acrylic and/or UC curable modified acrylics; and
 a plurality of front panel openings arranged in a perimeter region of the front panel, for mounting the front panel in a frame.

2. The front panel of claim 1, wherein the substrate is 2 mm to 10 mm thick.

3. The front panel of claim 2, wherein the substrate is about 3 mm thick.

4. The front panel of claim 1, wherein one of the front-side hardcoat and backside hardcoat is 1 µm to 10 µm thick.

5. The front panel of claim 4, wherein one of the front-side hardcoat and backside hardcoat is about 1 µm thick.

6. The front panel of claim 1, wherein the wavelength of light is about 405 nm.

7. The front panel of claim 1, wherein each of the front-side hardcoat and backside hard coat comprise an anti-glare (AG) hardcoat.

8. The front panel of claim 7, wherein the front panel is optically coupled to a plurality of light phosphor display (LPD) panels, arranged in a tiled LPD panel formation.

9. The front panel of claim 7, wherein the plurality of front panel openings comprise pressure dispersant openings.

10. The front panel of claim 8, wherein at least one of the front-side hardcoat and backside hardcoat is applied in a region defined by the perimeter region.

11. The front panel of claim 8, the front panel further comprising an additional dye for blocking wavelengths of light in a near infrared range.

12. A display system, comprising:
 a plurality of light engines;
 a plurality of light phosphor display (LPD) panels, each of the plurality of LPD panels optically coupled to a respective one of the plurality of light engines;
 a front panel optically coupled to the plurality of LPD panels, comprising:
  a substrate comprising a first polycarbonate component containing a light blocking dye configured to block ultraviolet visible (UVV) having a wavelength of 395-495 nm and near infrared (NIR) light having a wavelength of 800-2500 nm, wherein the substrate has an optical density of 1.15+/−0.05;
  a backside hardcoat deposited on a backside of the substrate, the backside optically coupled to the plurality of LPD panels;
  a front-side hardcoat deposited on a front side of the substrate; and
  a plurality of front panel openings about a perimeter region of the substrate, capable of mounting the substrate to a frame.

13. The display system of claim 12, wherein at least one of the backside hardcoat and front-side hardcoat further comprise anti-glare particles.

14. The display system of claim 13, wherein the light blocking dye blocks wavelengths of light of about 405 nm.

15. The display system of claim 14, the substrate further comprising near infrared blocking dye.

16. A method for fabricating a front panel for a display system, comprising:
 combining a first pellet group comprising polycarbonate pellets with a second pellet group comprising polycarbonate pellets containing a first light-blocking dye configured to block ultraviolet visible (UVV) and a second light-blocking dye configured to block near infrared (NIR) light, wherein the substrate has an optical density of 1.15+/−0.05, to form an aggregate pellet group;

melting the aggregate pellet group to an aggregate mixture;

extruding a substrate having a front side and a backside using the aggregate mixture;

applying a hardcoat to the front side and backside to the substrate; and machining a plurality of openings along an edge of the substrate.

17. The method of claim 16 wherein the substrate has a concentration of 7 grams of the light blocking dye per square meter of the substrate.

18. The method of claim 17, wherein the substrate has a thickness from about 2 mm to 10 mm.

19. The method of claim 18, wherein the aggregate pellet group further comprises a third pellet group comprising polycarbonate pellets containing a near infrared blocking dye.

* * * * *